(12) United States Patent
Gupta et al.

(10) Patent No.: US 11,384,166 B2
(45) Date of Patent: Jul. 12, 2022

(54) PROCESS OF PREPARING POLYOLEFIN WITH THE DISCONTINUOUS ADDITION OF A THERMAL RUNAWAY REDUCING AGENT

(71) Applicant: SABIC GLOBAL TECHNOLOGIES B.V., Bergen op Zoom (NL)

(72) Inventors: Sanjeev Kumar Gupta, Geleen (NL); Mohammed Al-Ofi, Geleen (NL); Ravi Ranjan Kumar, Geleen (NL); Abdulrahman Albeladi, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 418 days.

(21) Appl. No.: 16/331,234

(22) PCT Filed: Sep. 1, 2017

(86) PCT No.: PCT/EP2017/071943
§ 371 (c)(1),
(2) Date: Mar. 7, 2019

(87) PCT Pub. No.: WO2018/046395
PCT Pub. Date: Mar. 15, 2018

(65) Prior Publication Data
US 2019/0185591 A1    Jun. 20, 2019

Related U.S. Application Data

(60) Provisional application No. 62/400,322, filed on Sep. 27, 2016.

(30) Foreign Application Priority Data

Sep. 8, 2016 (EP) .................................... 16187880

(51) Int. Cl.
*C08F 2/38* (2006.01)
*C08F 2/01* (2006.01)
(Continued)

(52) U.S. Cl.
CPC ............... *C08F 2/38* (2013.01); *B01J 8/1809* (2013.01); *B01J 8/24* (2013.01); *C08F 2/01* (2013.01);
(Continued)

(58) Field of Classification Search
USPC ..................................................... 526/68, 86
See application file for complete search history.

(56) References Cited

U.S. PATENT DOCUMENTS 4,588,790 A * 5/1986 Jenkins, III ............ B01J 8/1809
526/70
4,771,024 A    9/1988 Nestlerode et al.
(Continued)

FOREIGN PATENT DOCUMENTS

EP    0019330 A1    11/1980
EP    0315192 A1    5/1989
(Continued)

OTHER PUBLICATIONS

International Search Report for International Application No. PCT/EP2017/071943, International Filing Date Sep. 1, 2017, 2 pages.
(Continued)

*Primary Examiner* — Fred M Teskin
(74) *Attorney, Agent, or Firm* — Cantor Colburn LLP (57) ABSTRACT

The present invention relates to a process for the continuous preparation of a polyolefin from one or more α-olefin monomers in a reactor system, the process for the continuous preparation of polyolefin comprising the steps of: feeding a polymerization catalyst to a fluidized bed through an inlet for a polymerization catalyst; feeding the one or more monomers to the reactor, polymerizing the one or more monomers in the fluidized bed to prepare the polyolefin; withdrawing polyolefin formed from the reactor through an outlet for polyolefin; withdrawing fluids from the reactor
(Continued)

through an outlet for fluids and transporting the fluids through first connection means, an heat exchanger to cool the fluids to produce a cooled recycle stream, and through second connection means back into the reactor via an inlet for the recycle stream; wherein a thermal run away reducing agent (TRRA) is added to the reactor in a discontinuous way.

17 Claims, 3 Drawing Sheets

(51) Int. Cl.
| | |
|---|---|
| *C08F 10/02* | (2006.01) |
| *C08F 10/06* | (2006.01) |
| *C08F 110/02* | (2006.01) |
| *C08F 110/06* | (2006.01) |
| *B01J 8/18* | (2006.01) |
| *B01J 8/24* | (2006.01) |
| *C08F 4/654* | (2006.01) |

(52) U.S. Cl.
CPC .............. *C08F 10/02* (2013.01); *C08F 10/06* (2013.01); *C08F 110/02* (2013.01); *C08F 110/06* (2013.01); *B01J 2219/00033* (2013.01); *B01J 2219/00063* (2013.01); *C08F 4/6545* (2013.01); *C08F 4/6548* (2013.01); *C08F 2400/02* (2013.01)

(56) References Cited

U.S. PATENT DOCUMENTS

| | | | |
|---|---|---|---|
| 4,866,022 A | 9/1989 | Arzoumanidis et al. | |
| 5,093,415 A | 3/1992 | Brady, III et al. | |
| 5,391,657 A | 2/1995 | Song et al. | |
| 6,365,681 B1 * | 4/2002 | Hartley | C08F 2/00 |
| | | | 526/59 |
| 6,646,074 B2 | 11/2003 | Herzog et al. | |
| 6,825,146 B2 | 11/2004 | Kilty et al. | |
| 7,420,021 B2 | 9/2008 | Chen | |
| 8,865,847 B2 | 10/2014 | Hoang et al. | |
| 2008/0319146 A1 * | 12/2008 | Bradley | C08F 110/06 |
| | | | 526/65 |
| 2009/0118118 A1 | 5/2009 | Chen et al. | |
| 2011/0065846 A1 | 3/2011 | Grosjean et al. | |
| 2015/0175719 A1 | 6/2015 | Hendrickson et al. | |

FOREIGN PATENT DOCUMENTS

| | | |
|---|---|---|
| EP | 0811638 A2 | 12/1997 |
| EP | 1273595 A1 | 1/2003 |
| EP | 2174961 B1 | 3/2015 |
| WO | 9960036 A1 | 11/1999 |
| WO | 03068828 A1 | 8/2003 |
| WO | 2007134851 A1 | 11/2007 |
| WO | 2015077598 A1 | 5/2015 |

OTHER PUBLICATIONS

Pullukat et al. "Silica-Based-Ziegler-Natta Catalysts: A Patent Review"; Catalysis Reviews, 41:3-4, pp. 389-428 (1989).
Written Opinion for International Application No. PCT/EP2017/071943, international Filing Date Sep. 1, 2017, dated Nov. 3, 2017, 4 Pages.
European Opposition for European Application No. 17762090.3; Application Filing Date: Sep. 8, 2016; dated Mar. 5, 2021; 26 pages.

* cited by examiner

PROCESS OF PREPARING POLYOLEFIN WITH THE DISCONTINUOUS ADDITION OF A THERMAL RUNAWAY REDUCING AGENT

CROSS REFERENCE TO RELATED APPLICATIONS

This application is a 371 of International Application No. PCT/EP2017/071943, filed Sep. 1, 2017, which is incorporated herein by reference in its entirety, and which claims priority to EP Application No. 16187880.6 filed Sep. 8, 2016, and U.S. Patent Application No. 62/400,322 filed September 27, 2016.

BACKGROUND

The present invention relates to a process for the continuous preparation of a polyolefin from one or more α-olefin monomers in a fluidized bed reactor, the process comprising the steps of feeding a polymerization catalyst and one or more monomers to the reactor, polymerizing the one or more monomers to prepare a polyolefin in the reactor; withdrawing a polyolefin formed from the reactor, and circulating fluids withdrawn from the reactor via a heat exchanger to cool the fluids back into the reactor, wherein a thermal run away reducing agent (TRRA) is added to the reactor in a discontinuous way to prevent thermal runaway of the reactor.

Continuous gas phase fluidized bed polymerization processes for the preparation of polyolefins are known. When such a process is carried out in the presence of a catalyst of high activity, variations in the course of the polymerization, resulting for example from slight fluctuations in the quality of the catalyst or the olefin or other raw materials used in the reaction, can cause changes in the behavior and the catalytic activity of the polymer particles in the bed. These variations are known to have a particularly adverse effect in a gas-phase polymerization process because of the fact that the heat exchange capacity of a gas-phase is much lower than that of a liquid-phase. In particular, these variations can cause an unexpected increase in the amount of heat generated by the reaction, which cannot be removed rapidly enough and efficiently by the gaseous reaction mixture passing through the bed, and can give rise to the appearance of so-called hot spots in the bed, as well as the formation of agglomerates of molten polymer.

Skin activity is defined as hotspots identified by temperature increase relative to bulk at fixed location on inner reactor wall. When hot spots appear in the bed, it is generally too late to prevent the formation of agglomerates and/or sheeting which can either reduce the preparation rate and/or may even lead to complete stoppage of preparation. In most cases, the reactor needs to be opened to clean the agglomerates, e.g. sheets, before the product preparation ion can be initiated. This amounts to either operating at lower rates for an extended period of time or complete stop of preparation for few days to couple of weeks.

It is known that the preparation rate (synonym for production rate) (i.e. the space time yield in terms of weight of polymer produced per unit volume of reactor space per unit time) in commercial gas fluidized bed reactors is restricted by the maximum rate at which heat can be removed from the reactor. The rate of heat removal can be increased, for example, by increasing the velocity of the recycle gas and/or reducing the temperature of the recycle gas. However, there is a limit to the velocity of the recycle gas that can be used in commercial practice. Beyond this limit, the bed can become unstable or even lift out of the reactor in the gas stream, leading to blockage of the recycle line and damage to the recycle gas compressor or blower. There is also a limit on the extent to which the recycle gas can be cooled in practice. This is primarily determined by economic considerations, and in practice is normally determined by the temperature of the industrial cooling water available on site. Refrigeration can be employed if desired, but this adds to the production costs. Thus, in commercial practice, the use of cooled recycle gas as the sole means of removing the heat of polymerization from the gas fluidized bed polymerization of olefins has the disadvantage of limiting the maximum obtainable production rates.

Prior art methods, such as those disclosed in US2009/0118118 and U.S. Pat. No. 7,420,021, have solved the problem of reaction runaway by the addition of a chemical compound, known as a thermal runaway reducing agent (TRRA), in the stream of the selectivity control agent (SCA) (also known as external electron donor (EED)). This has proven to be effective in reducing the occurrence of reaction runaway.

The present inventors have observed that in these prior art methods, the overall productivity is not optimal. The use of such mixtures improves the reactor continuity at the cost of significant reduction in catalyst activity, and/or production rates or in a deterioration of the quality of the polymer manufactured, especially an increase in the proportion of catalyst residues in the polymer. The effect of the TRRA is that the productivity of the catalyst is lowered, which has a decreasing effect on the productivity.

It is an object of the present invention to provide a novel method for the production of polyolefins having a good productivity and limited (or reduced) reaction runaway or reactor shutdown.

SUMMARY

This object is achieved by the present invention. In a first aspect the present invention relates to a process—as disclosed in claim 1—for the continuous preparation of a polyolefin from one or more α-olefin monomers in a reactor system, the process for the continuous preparation of polyolefin comprising several steps; and wherein the temperature of the reactor wall is measured at a plurality of positions by a plurality of temperature sensing means and wherein a thermal run away reducing agent (TRRA) is added to the reactor when at least one of a plurality of the temperature sensing means measures a temperature that is at least 2° C. above the average temperature of the plurality of temperature sensing means; and/or wherein the (average) static voltage is measured by the one or more static voltage indicators and wherein a thermal run away reducing agent (TRRA) is added to the reactor when the (average) static voltage is above (that means outside±) 200 Volt; and/or wherein the polymerization temperature is measured and wherein a thermal run away reducing agent (TRRA) is added to the reactor when the polymerization temperature is at least 5° C. above the predetermined polymerization temperature; and/or wherein the polyolefin withdrawn from the reactor is analyzed to determine the percentages of fines and wherein thermal run away reducing agent (TRRA) is added to the reactor when the polyolefin comprise more than 2 wt. % fines based on the weight of the polyolefin; and/or wherein the polyolefin withdrawn from the reactor is analyzed to determine the presence of one or more agglomerates and wherein a thermal run away reducing agent (TRRA) is added to the reactor when one or more agglomerates are observed; and/or wherein the flow of the fluids in the heat exchanger, first connection means and/or second connection means is measured using means for measuring the flow of fluids and wherein a thermal run away reducing agent (TRRA) is added to the reactor when the flow decreases by at least 20% per unit of time.

In this first aspect, the reactor system comprises:
a reactor comprising:
  a lower part, comprising a distribution plate and an inlet for a recycle stream below the distribution plate;
  a middle part above said lower part, said middle part comprising a fluidized bed, an inlet for a polymerization catalyst, an outlet for polyolefin; and
  an upper part above said middle part, said upper part comprising an outlet for fluids;
a heat exchanger;
first connection means (also called first connection means for fluids) connecting the outlet for fluids to the heat exchanger; and
second connection means (also called second connection means for fluids) connecting the heat exchanger to the inlet for a recycle stream; enabling a flow of fluids through said heat exchanger.

In this first aspect, the process for the continuous preparation of polyolefin comprises the steps of:
feeding a polymerization catalyst to the fluidized bed through the inlet for a polymerization catalyst;
feeding the one or more monomers to the reactor,
polymerizing the one or more monomers in the fluidized bed to prepare the polyolefin;
withdrawing polyolefin formed from the reactor through the outlet for polyolefin;
withdrawing fluids from the reactor through the outlet for fluids and transporting the fluids through the first connection means, the heat exchanger to cool the fluids to produce a cooled recycle stream, and through the second connection means back into the reactor via the inlet for the recycle stream.

In an embodiment, the one or more monomers at least include ethylene or propylene. In other words, at least one of the one or more monomers is ethylene or propylene, e.g. a homopolymer of ethylene or a homopolymer of propylene or a copolymer of ethylene and/or propylene and optionally one or more other monomers.

In an embodiment, a titanium comprising polymerization catalyst is used and wherein the molar ratio of the thermal run away reducing agent to titanium in the polymerization catalyst (TRRA/Ti) is at least 1.0, preferably at most 25.

In an embodiment, the temperature of the reactor wall is measured at a plurality of positions by a plurality of temperature sensing means and wherein a thermal run away reducing agent (TRRA) is added to the reactor when at least one of a plurality of the temperature sensing means measures a temperature that is at least 2° C. above the average temperature of the plurality of temperature sensing means, the position of said at least one of a plurality of the temperature sensing means being defined as a hot spot; wherein TRRA is added through an inlet for TRRA, which is below the vertical position of the hot spot. With "above the average temperature of the plurality of temperature sensing means" is meant above the average temperature as determined by mathematically determining the average of the temperature as measured by the plurality of temperature sensing means.

In an embodiment, the (average) static voltage is measured by the one or more static voltage indicators and wherein a thermal run away reducing agent (TRRA) is added to the reactor when the (average) static voltage is above (that means outside±) 200 Volt through an inlet for TRRA at the inlet for recycle gas.

In an embodiment, the polymerization temperature is measured and wherein a thermal run away reducing agent (TRRA) is added to the reactor when the polymerization temperature is at least 5° C. above the predetermined polymerization temperature, wherein said TRRA is added through an inlet for TRRA at the inlet for recycle gas.

In an embodiment, the polyolefin withdrawn from the reactor is analyzed to determine the percentages of fines and wherein thermal run away reducing agent (TRRA) is added to the reactor when the polyolefin comprise more than 2 wt. % fines based on the weight of the polyolefin, wherein said TRRA is added through an inlet for TRRA at the inlet for recycle gas.

In an embodiment, the polyolefin withdrawn from the reactor is analyzed to determine the presence of one or more agglomerates and wherein a thermal run away reducing agent (TRRA) is added to the reactor when one or more agglomerates are observed, wherein said TRRA is added at an inlet for TRRA in the upper zone of the fluidized bed. With the upper zone of the fluidized bed is meant in the present application the upper half of the fluidized bed.

In an embodiment, the flow of the fluids in the heat exchanger, first connection means and/or second connection means is measured using means for measuring the flow of fluids and wherein a thermal run away reducing agent (TRRA) is added to the reactor when the flow decreases by at least 20% per unit of time, wherein said TRRA is added at an inlet for TRRA in the upper zone of the fluidized bed. With the upper zone of the fluidized bed is meant in the present application the upper half of the fluidized bed.

In an embodiment, the thermal runaway reducing agent is added to the reactor with a TRRA/Ti molar ratio of between 1.0 and 10.0, preferably between 1.0 and 4.0. when at least one of a plurality of the temperature sensing means measures a temperature that is at least 2° C. above the average temperature of the plurality of temperature sensing means; and/or when the (average) static voltage is above 200 Volt; and/or when the polyolefin comprise more than 2 wt. % fines based on the weight of the polyolefin; and/or when one or more agglomerates are observed. In an embodiment, the TRRA/Ti ratio is variable over several steps; for example increasing with at least 0.2 TRRA/Ti per step, for example increasing with at least 0.3, for example at least increasing with at least 0.4 or even at least 0.5 molar ratio. In an embodiment, the starting TRRA/Ti ratio is 1.0, in the next step this is 1.3, in the following step 1.6 and so on. There may be at least two steps, or at least three steps, or at least four steps or even five, six, seven or more steps.

In an embodiment, the thermal runaway reducing agent is added to the reactor with a TRRA/Ti molar ratio of between 10 and 20 when the polymerization temperature is at least 5° C. above the predetermined polymerization temperature; and/or when the flow decreases by at least 20% per unit of time.

In an embodiment, the addition of TRRA is performed for a period of at most 20 minutes, preferably at most 15 minutes, more preferably at most 10 minutes.

In an embodiment, TRRA is added when: at least one of a plurality of the temperature sensing means measures a temperature that is at least 2° C. above the average temperature of the plurality of temperature sensing means and the (average) static voltage is above 200 Volt; or at least one of a plurality of the temperature sensing means measures a temperature that is at least 2° C. above the average temperature of the plurality of temperature sensing means and the polymerization temperature is at least 5° C. above the predetermined polymerization temperature; or at least one of a plurality of the temperature sensing means measures a temperature that is at least 2° C. above the average temperature of the plurality of temperature sensing means and the polyolefin comprise more than 2 wt. % fines based on the weight of the polyolefin; or at least one of a plurality of the temperature sensing means measures a temperature that is at least 2° C. above the average temperature of the plurality of temperature sensing means and one or more agglomerates are observed; or at least one of a plurality of the temperature sensing means measures a temperature that is at least 2° C. above the average temperature of the plurality of temperature sensing means and the flow decreases by at least 20% per unit of time; or the (average) static voltage is above 200 Volt and the polymerization temperature is at least 5° C. above the predetermined polymerization temperature; or the (average) static voltage is above 200 Volt and the polyolefin comprise more than 2 wt. % fines based on the weight of the polyolefin; or the (average) static voltage is above 200 Volt and one or more agglomerates are observed; or the (average) static voltage is above 200 Volt and the flow decreases by at least 20% per unit of time; or the polymerization temperature is at least 5° C. above the predetermined polymerization temperature and the polyolefin comprise more than 2 wt. % fines based on the weight of the polyolefin; or the polymerization temperature is at least 5° C. above the predetermined polymerization temperature and one or more agglomerates are observed; or the polymerization temperature is at least 5° C. above the predetermined polymerization temperature and the flow decreases by at least 20% per unit of time; or the polyolefin comprise more than 2 wt. % fines based on the weight of the polyolefin and one or more agglomerates are observed; or the polyolefin comprise more than 2 wt. % fines based on the weight of the polyolefin and the flow decreases by at least 20% per unit of time; or one or more agglomerates are observed and the flow decreases by at least 20% per unit of time.

DETAILED DESCRIPTION

Definitions

With 'continuous polymerization of one or more α-olefins' or 'continuous preparation of polyolefin' is meant herein that one or more α-olefin monomers, of which at least one is ethylene or propylene, are fed to the reactor and polyolefin thus prepared is (semi)-continuously withdrawn through a polymer discharge system connected to the reactor.

With a 'reactor' is herein meant a vessel designed for reactions to take place therein, comprising inlets for receiving feed materials and outlets for discharging reaction products.

With 'inner diameter' of the reactor is meant the diameter in a given horizontal plane perpendicular to the centre line of the reactor as measured from the inside of the inner wall of the reactor.

With 'reactor continuity' is meant the conditions including reactor stability and steady state operation without shutting or idling of reactor due to agglomeration of polymers, sheeting or chunking of the reactor.

With 'sheeting' is meant the formation of solid flat polymer slabs in the reactor, which can plug the product discharge system vessels or resin conveying line. Usually one inch to few inches thick and varies in size from several inches to several feet. These are formed on the reactor walls due to adhering of fines to the reactor wall.

With 'chunking' is meant the formation of solid oval polymer chunks in the Reactor, which can plug product discharge system or conveying lines. These are of several inches in diameter and formed in the bulk due to insufficient cooling or localized over-heating.

With 'agglomeration' is meant the adherence of polyolefin (or resin) particles together up to one inch in diameter.

With 'static activity' is meant variations and deviations of normalized static charge generated in the reactor due to friction of resin particles in fluidized bed. This can be caused due to presence of prostatic agents like O2, Methanol, etc., or due to poor dissipation of static charges. Usually, this is measured by a static probe few inches within the reactor wall.

With 'hot spots' is meant the adherence of resin particles to the wall due to certain conditions results in reaction at the wall without efficient heat removal. In such cases the temperature at the spot rises above the normal bulk temperature. This is called hot spot or skin activity.

With "fines" is meant very small resin particles. ASTM D1921-12 method is used to determine the particle-size distribution. The measurement of fines is part of that procedure. Fines as used in the present invention is defined at the wt. % of resin which passes through a 125 microns sieve.

With 'catalyst' as used herein is meant to include both catalyst and co-catalyst, and any other compounds, which assist in catalyzing the preparation of the polyolefin as well as the prepolymerized catalyst (the catalyst to which one or more α-olefin monomers of which at least one is ethylene or propylene is attached).

With 'fluidized bed' as used herein is meant that particles (in this case preferably the catalyst and/or the catalyst to which one or more α-olefin monomers is attached, herein also referred to as prepolymerized catalyst, and the growing polymer particles) are held suspended by the fluids stream in which a particle/fluids mixture acts as a fluid.

For the avoidance of doubt the term 'fluids' encompasses liquids, gases and mixtures thereof, wherein the term 'liquids' includes liquids containing solid particles, such as slurries.

Present Teachings

A process for the gas-phase polymerization has now been found which makes it possible to overcome, or at least mitigate, the above-mentioned disadvantages. In particular, the process makes it possible to manufacture polymers continuously, with a high productivity and a low content of catalyst residues, without concern for the unavoidable slight variations in the quality of the propylene or the catalyst or other raw materials or in the supply of catalyst to the reactor.

The present teaching relates to the addition of a TRRA only during certain time periods of the polymerization process and optionally at certain positions in the reactor.

It has been found that by introducing the TRRA only when there is a risk of possible reaction runaway (pre-alarm phase) the reaction is kept without any runaway and, since only a limited amount of TRRA is added, the overall productivity is increased compared to a method according to the prior art, where TRRA is continuously added in the SCA-containing stream.

Therefore, the process of the invention combines the possibility of having a high production rate without deteriorating the properties of the prepared polyolefin and without deteriorating the reactor operability. Additionally, the process continuity (i.e. how long you can run without having an unplanned shut down) is improved.

There are several positions in the reactor where the TRRA may be added. The TRRA may be dosed in the reactor bed at one or more injection points at a certain vertical position. The TRRA may also be dosed at the recycle stream inlet below the distributor plate. In these embodiments, the TRRA addition is localized. The conditional and localized addition of TRRA allows the tuning of small amounts of TRRA to be brought only to the spots where and when needed. This ensures that the reaction rate in the remainder of the reactor may be kept (almost) at the same value as prior to the TRRA addition, so that the productivity is not lowered where not needed. This improves the uniformity of the temperature profile along the length of the reactor, and hence a more uniform polyolefin is produced.

It was found by the inventors that the discontinuous dosing of the TRRA reduces the catalyst activity and very effectively controls the reactor instability. Continuous use of activity-retarders according to prior art methods provide the similar effect but causes a permanent drop in catalyst activity. The inventive process identifies the critical parameters and enlists the initiating point at which TRRA should be added, and optionally the preferred addition rates and the preferred addition locations. It is also possible to identify the specific points at which the TRRA addition could be stopped and the polymerization process can be continued without any impact on the catalyst activity. This will be discussed below.

It was found by the inventors that the specific cost of catalyst system can be reduced by 30-40% in comparison to continuous use of activity-retarders, while maintaining the same reactor stability by using the proposed process. Another advantage of the present invention is that polyolefins thus manufactured have an appreciably reduced content of transition metal, when compared to continuous use of activity-retarders, and, consequently, are of a superior quality. Moreover, with this process, it is also possible to use very high yield catalysts whose polymerization activity is particularly sensitive to slight variations in the polymerization conditions.

Reaction System Set Up

The reactor comprising at least a lower part, a middle part and an upper part. The lower part comprises a distribution plate and an inlet for a recycle stream below the distribution plate. The middle part comprises a fluidized bed, an inlet for a polymerization catalyst, an outlet for polyolefin, and optionally a plurality of temperature sensing means for measuring the temperature of an inner wall of the reactor, and optionally one or more static voltage indicators for measuring the static voltage. When one static voltage indicator is used the value is the static voltage; when more than one static voltage indicator is used a mathematical average is determined providing an average static voltage. In the claims "static voltage" is used which can be both average static voltage or static voltage. The upper part of the reactor may comprise an extended section and it comprises an outlet for fluids. The reactor has an inner wall; said inner wall of the reactor may be the inner envelope delimiting the reactor. The reactor is preferably closed off at the top and the bottom by a hemisphere.

The reaction system comprises the reactor specified above and moreover a heat exchanger, first connection means (such as pipes or tubes) to connect the outlet for fluids of the reactor to the heat exchanger; and moreover second connection means (such as pipes or tubes) to connect the heat exchanger to the inlet for a recycle stream of the reactor. The reaction system optionally comprises means for measuring the flow of fluid, preferably in the heat exchanger, first connection means and/or second connection means.

A fluidized bed may be achieved by placing the amount of particles under appropriate conditions, for instance by upwardly flowing fluids (gas and or gas/liquid mixture) through the solid particles at a velocity that exceeds the minimum fluidization velocity and enough to suspend the solid particles and causing them to behave as a fluid. The velocity should not be so high as to result in undue removal of polymer particles from the bed.

In order to maintain a fluidized bed in the process of the invention, the superficial gas velocity may be in the range of 0.5 to 5 m/s. For example, may be at least 1 m/s, for example at least 1.5 m/s, for example at least 2 m/s, and/or for example at most 4.5 m/s, for example at most 4 m/s, for example at most 3.5 m/s, for example at most 3 m/s.

The expanded section that is optionally located at or near the top of the reactor is not intended for gas-phase polymerization, but instead is suitable for gas expansion. It has the function to disengage the reaction mixture and the polymer product of the reaction. Accordingly, this section does not function as a reaction zone. The superficial gas velocity may be of such low value that polymer particles preferably do not enter into the expanded section, for example to avoid clogging to occur in the compressor. In the reactor, during the course of polymerization, fresh polymer particles are produced by catalytic polymerization of α-olefin monomers. Such polymer particles may be projected upwards in the direction of the expanded section through the circulating gas. Most of these particles do preferably not reach the expanded section or return to the fluidized bed by gravity as the superficial gas velocity decreases in the expanded section.

The distribution plate may be any device that is suitable for distributing the cooled recycle stream in the reactor to keep a fluidized bed and to serve as a support for a quiescent bed of the polymerization catalyst and polyolefin when the reactor is not in operation. The distribution plate is used for achieving good gas distribution. For example, the distribution plate may be a screen, slotted plate, perforated plate, a plate of the bubble-cap type, or other conventional or commercially available plate or other fluid distribution device. An example of a commonly used type of distribution plate is a perforated plate with some above-hole structure on top of each hole, to prevent particle sifting. The distribution plate is generally positioned perpendicularly to the longitudinal axis of a reactor, wherein the fluidized bed is located above said distribution plate and a mixing chamber region below said distribution plate.

In addition to the distribution plate, the reactor may be further equipped with other means for agitation, such as mechanical agitation, for example a stirrer. In an embodiment, the reactor does not comprise mechanical agitation. The reactor may for example be operated in dry more or in condensed mode.

Embodiments of Reaction System

Some special embodiments of systems suitable for the process of the invention are schematically represented in the Figures without being limited thereto.

Figure 1:
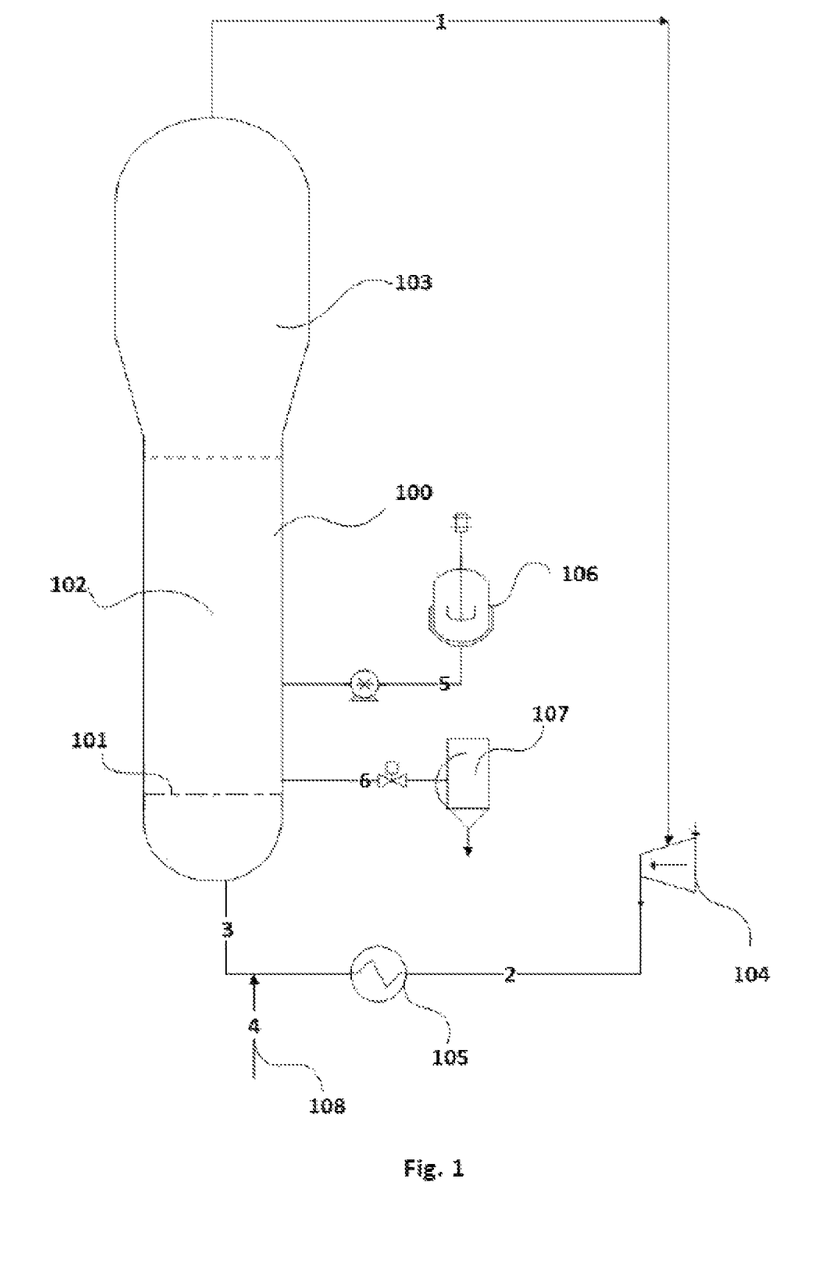
FIG. 1 illustrates a system suitable for the continuous preparation of a polyolefin according to the process of the invention.

FIG. 1 illustrates a reactor system suitable for the continuous preparation of a polyolefin in a reactor from one or more α-olefin monomers, comprising reactor system comprises a reactor 100, said reactor comprising a distribution plate 101, an inlet 3 for a cooled recycle stream located under the distribution plate, an expanded section 103, an inlet 5 for providing the catalyst coming from the catalyst feeding system 106, an outlet 6 for providing the polyolefin to product discharge system 107, an outlet 1 for a recycle stream and a fluidized bed 102; said system further comprising a compressor 104 connected to said outlet 1 for the recycle stream, said compressor 104 having an outlet 2 for compressed fluids which are brought to a heat exchanger 105 via the line 2, said cooled recycle stream leaving said heat exchanger 105 being entered into the reactor 100 via inlet 3 for a cooled recycle stream. A makeup mixing point 108 for monomer and other reactants is added to the system through line 4.

The system of FIG. 1 (FIG. 1) is only one of numerous possible schematic arrangements. Thus, for example, the sequence of the equipment items in the circulated gas line, particularly of the heat exchanger and compressor can also be reversed or further equipment items can be integrated into the line. Further elements such as systems for addition of the catalyst are not shown in FIG. 1, such elements are known to those skilled in the art and can be integrated into the reactor system in a known manner.

Figure 2:
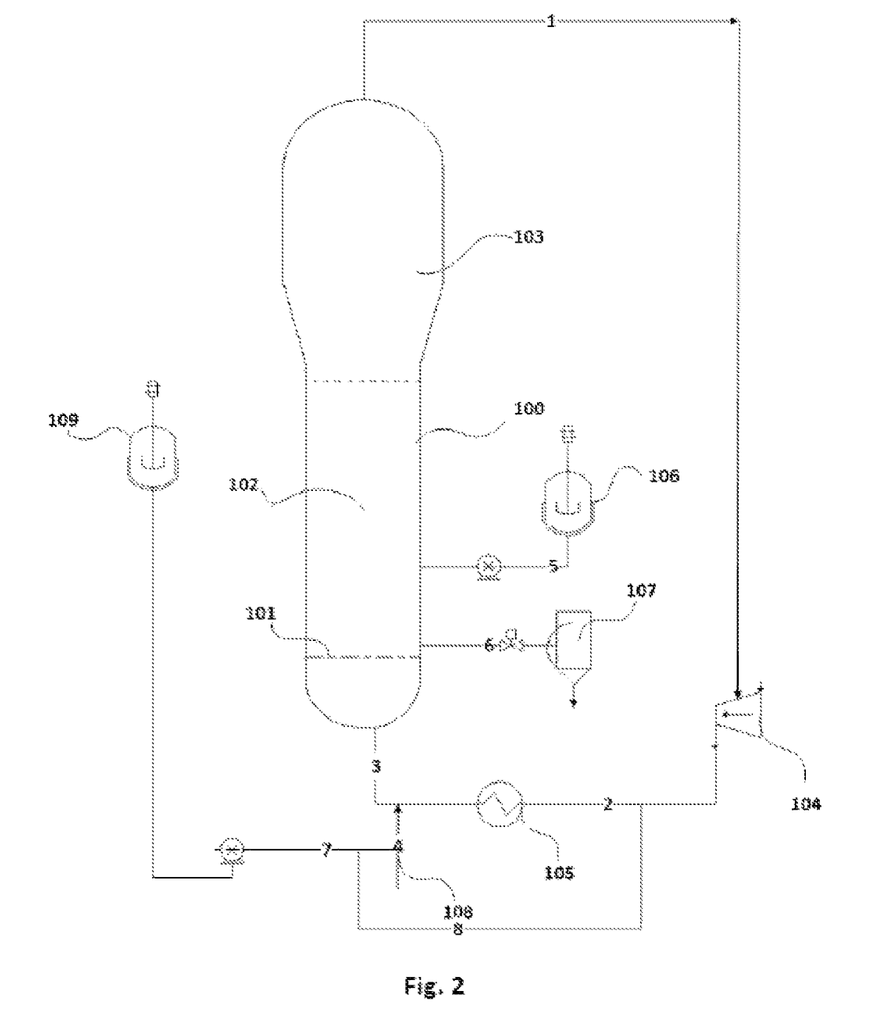
FIG. 2 illustrates a special embodiment of the system of FIG. 1.

FIG. 2 illustrates an embodiment of the reaction system, the same reference numbers as discussed in FIG. 1 have the same meaning. The reaction system of FIG. 2 comprises means for receiving TRRA which is denoted as 109 either connected to a liquid-containing stream drawn from any point downstream of the heat exchanger 105 described as line 7—and/or connected to a gaseous stream drawn from a point downstream of the compressor 104 and upstream of the heat exchanger 105—through line 8.

Figure 3:
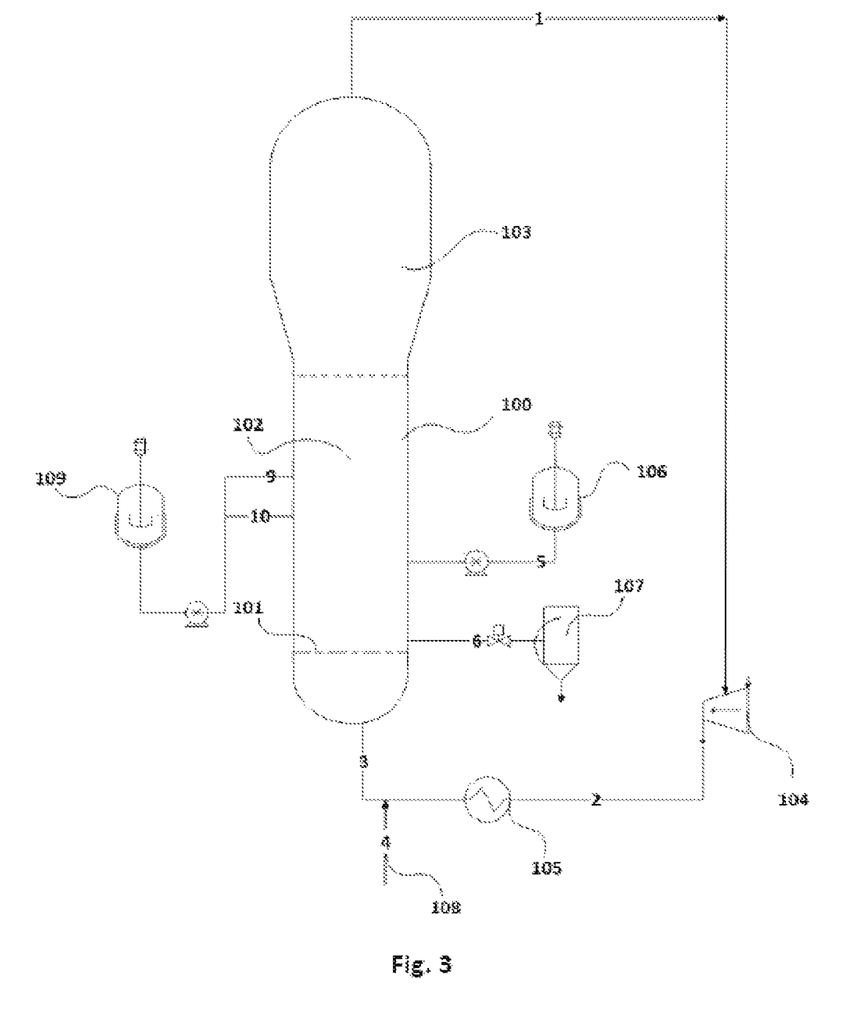
FIG. 3 illustrates another special embodiment of the system of FIG. 1.

FIG. 3 illustrates an embodiment of the reaction system, the same reference numbers as discussed in FIG. 1 have the same meaning. The reaction system of FIG. 3 comprises means for receiving TRRA into the upper half of the fluidized bed through lines 9 and 10 which can be on the same side on two different levels or can be on the same level opposite to each other.

Operating Conditions

A gas-phase polymerization process is generally carried out by maintaining substantially constant operating conditions, such as the composition of the gaseous reaction mixture, the total pressure, the catalyst feeding rate, the height or the weight of the bed, the polymerization temperature, the gas velocity, the fluidized bed densities, recycle stream inlet temperature, reactor wall temperatures etc. Also frequent sampling is taken from the reactor to check the resin (or polyolefin) properties. Under such conditions, any deviations, especially those relating to the reactor stability, which are further explained in this process, can be instantly noted and action can be taken either manually or trough automated control systems to start dosing the TRRA at suitable locations and at defined flow-rates.

Catalyst

The polymerization catalyst may be fed to the reactor for example by using feeding means, such as a pump. The polymerization catalyst may for example be fed as a suspension in a solvent, for example a hydrocarbon solvent or the like, or in an inert gas, such as nitrogen (dry catalyst). The polymerization catalyst may also be injected into the fluidized bed. The polymerization catalyst may be fed at any position in the area above the distribution plate or at a combination of positions in the reactor.

A Ziegler Natta catalyst may be used together with a co-catalyst in the system and process of the invention. Suitable examples of co-catalysts include but are not limited to organo aluminium compounds having formula AlR3, wherein R stands for a hydrocarbon having 1 to 10 C-atoms. Examples of organo aluminium compounds having formula AlR3 include triethylaluminium alkyl, triisobutyl aluminium trialkyl, tri-n-hexyl aluminium and tri octyl aluminium. The optimal amount of catalyst and ratios of procatalyst to co-catalyst and potential external donors can easily be determined by the person skilled in the art.

Examples of inert substrates that can be used as support for a Ziegler Natta catalyst include inorganic oxides, for example oxides of silica, alumina, magnesium, titanium and/or zirconium; magnesium chloride, clays, zeolites, polystyrene, polyethylene, polypropylene, graphite and/or layered silicates.

Ziegler-Natta catalyst systems and their components are suitable for preparing a polyolefin and are generally known. "Ziegler-Natta" (Z-N) refers to catalyst systems comprising a transition metal-containing solid catalyst compound (also typically referred to as a procatalyst); an organometallic compound (also typically referred to as a co-catalyst) and one or more electron donor compounds (e.g. external electron donors). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1. Several examples of Ziegler-Natta catalyst are discussed below.

EP 1 273 595 of Borealis Technology discloses a catalyst obtained by reacting a complex of a Gp IIa metal, an electron donor, and a transition metal as an emulsion the dispersed phase of which contains more than 50 mol % of the Gp IIa metal in said complex. EP 0 019 330 of Dow discloses a Ziegler-Natta type catalyst obtained by reacting a halogenated magnesium compound, a halide of tetravalent titanium in the presence of a halohydrocarbon, and a tetravalent titanium compound. The Examples of U.S. Pat. No. 5,093,415 of Dow disclose a catalyst obtained by reacting titanium tetrachloride, diisobutyl phthalate, and magnesium diethoxide, and then titanium tetrachloride and phthaloyl chloride and again Example 2 of U.S. Pat. No. 6,825,146 of Dow discloses a catalyst obtained by reacting titanium tetrachloride, magnesium diethoxide, titanium tetraethoxide, and titanium tetrachloride, with ethylbenzoate, and again titanium tetrachloride, and benzoylchloride. U.S. Pat. No. 4,771,024 of Dow discloses a catalyst obtained by reacting dried silica with carbonated magnesium solution, then titanium tetrachloride, chlorobenzene and ethylbenzoate, and TiCl4 and chlorobenzene. WO03/068828 of China Petroleum discloses a catalyst obtained by reacting magnesium chloride, toluene, epoxy chloropropane and tributyl phosphate, then phthalic anhydride and TiCl4 and an internal donor, then again TiCl4. U.S. Pat. No. 4,866,022 of Amoco discloses a catalyst obtained by reacting a magnesium-containing species, a transition metal halide and an organosilane, again with transition metal compound and an electron donor.

For example, the Ziegler-Natta type procatalyst in the catalyst system according to the present invention is a magnesium-based supported catalyst obtained by the process as described in WO 2007/134851 A1, which process comprises the following phases: phase A): preparing a solid support for the procatalyst based on a Grignard compound and a silane compound; phase B): optionally activating said solid support obtained in phase A) using one or more activating compounds to obtain an activated solid support; phase C): contacting said solid support obtained in phase A) or said activated solid support in phase B) with a titanium catalytic species and optionally one or more internal donors and/or optionally an activator to obtain said procatalyst; optionally Phase D: modifying said intermediate product obtained in phase C) with a Group 13- or transition metal modifier and optionally one or more internal donors.

Olefin

The present invention preferably relates to the polymerization of one or more α-olefins comprising at least ethylene and/or propylene and optionally other α-olefin monomers. Other preferred α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one of more α-olefin monomers having from 4 to 8 α-olefin monomers. Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited to dec-1-ene and ethylidene norbornene.

When the system or process of the invention is used for the copolymerization of ethylene and/or propylene with α-olefin monomers, the ethylene and/or propylene preferably is used as the major component of the copolymer. For example, the amount of ethylene and/or propylene present in the copolymer is at least 65% by weight, for example at least 70% by weight, for example at least 80% by weight based on the total copolymer.

The one or more α-olefin monomers may be fed to the reactor using feeding means such as a pump. The monomers are for example fed to the reactor by adding the monomers to the fluids that are circulated from the top of the reactor to the inlet for the recycle stream prior to cooling of the fluids. Thus, the monomers are preferably fed into the reactor through the inlet of the recycle stream. Preferably, the one or more α-olefin monomers are added in such amounts that they make up for the one or more α-olefin monomer consumed during the polymerization.

The one or more α-olefin monomers may be fed in one or in multiple feeding streams. For example, one type of olefin monomer, typically ethylene and/or propylene may be comprised in the first feed and another type of α-olefin monomer, also referred to herein as the comonomer, may be comprised in the same or in a second feed.

SCA

Examples of suitable selectivity control agents/external donors are given in US2009/0118118 A1, hereby incorporated by reference.

Alkoxysilane SCA's, (methylcyclohexyldimethoxysilane (MChDMS or C-donor) and n-propyltrimethoxysilane (NPTMS) provide high productivity and superior product performance. They may however provide polymerization process control problems, as discussed above, especially sheeting and formation of large polymer chunks. At moderately higher reaction temperatures, they tend to be more active and at temperature close to the softening or melting point of the polymer, they still possess considerable activity leading to the formation of agglomerates. In addition, under conditions of a reactor upset or a power outage, the continued polymerization may generate excessive temperatures, resulting in fusion of the entire reactor contents into a solid mass requiring opening of the reactor and hazardous activity of chunk cutting and removal. With the process according to the present invention, these SCA's may be used without polymerization process control problems.

Polyolefin

The continuous polymerization of one or more α-olefin monomers will produce polyolefins in the form of particles, herein also referred to as 'polyolefin'. Examples of polyolefins which may thus be produced, include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene, such as propylene homopolymers and propylene copolymers, including random copolymers of propylene and ethylene or random copolymers of propylene and α-olefin monomer having from 4 to 8 carbon atoms, for example but-1-ene, pent-1-ene, hex-1-ene or 4-methylpent-1-ene and optionally ethylene, for example a random copolymer of propylene and at most 5wt % ethylene, and block or multi-block copolymers of propylene and optionally a comonomer (such as ethylene and/or α-olefin monomer having from 4 to 8 carbon atoms) and ethylene propylene rubber (EPR). Preferably, in the process of the invention, the produced polyolefin is a propylene, for example a propylene homopolymer, a propylene copolymer or a heterophasic copolymer, which is a composition comprising a propylene homopolymer or a propylene copolymer and an ethylene propylene rubber.

Polyolefin is produced continuously. The withdrawal of the polyolefin may be done at any position in the area above the distribution plate or at a combination of positions. The withdrawal is preferably continuous. Polyolefin may be withdrawn from the multi-zone reactor by any suitable means, for example a polymer discharge system. The polyolefin may be used as such or may be subjected to purification or other end-processing operation.

In another aspect, the invention relates to a polyolefin obtained or obtainable by the process of the invention. Such polyolefins are more homogeneous and the process of the invention is especially suitable for obtaining polyolefins having a low melt flow rate as determined according to ISO1133 at 230° C. and 2.16 kg, which are polyolefins that need a low concentration of chain transfer agent in the reactor.

Testing of Polymer

The polymer that is withdrawn from the reactor may tested, for example on the percentages of fines.

Fluids Circulation

Fluids (denoted as plural in the present description but may also be read as "fluid") are circulated from the top of the reactor to the bottom of the reactor. The circulating fluids are cooled using a heat exchanger, resulting in a cooled recycle stream comprising liquid. The cooled recycle stream is introduced into the reactor using the inlet for the recycle stream.

The fluids may be cooled to below the dew point of the fluids using any suitable cooling means. For example, cooling of the fluids may be performed using a cooling unit, for example a heat exchanger.

The dew point may be increased by increasing the operating pressure of the fluids and/or by increasing the percentage of condensable fluids and simultaneously decreasing the percentage of non-condensable gases in the fluids.

By feeding the fluids that are cooled to below the dew point of the fluids into the bottom inlet of the reactor, the fluids will be passed through the distribution plate (101) into the section above the distribution plate (101), resulting in the formation of a fluidized bed and/or a bubble column. Heat generated by the polymerization will cause the liquids in the fluids to evaporate. The feeding of the polymerization catalyst and the one or more α-olefin monomers to the reactor (100) will result in the formation of polyolefin (6), which is withdrawn from the reactor (100). The recycle stream is recirculated from the top of the reactor to the bottom inlet. The one or more α-olefin monomers and other fluids, such as hydrogen, an inert gas or liquid, for example a condensable inert component, may be added to the recycle stream to make up for the target composition (there is loss due to e.g. reaction, withdrawal and venting) before cooling the fluids to below the dew point of the fluids to form a cooled recycle stream.

Preferably in the processes of the invention, the fluids are cooled to such extent that the amount of liquid in the cooled recycle stream is at least 7% by weight, for example at least 9%, for example at least 14% by weight based on the total amount of liquid and gas. For example, the amount of liquid in the cooled recycle stream is at least 14.5%, for example at least 20%, for example at least 25% by weight based on the total amount of liquid and gas in the cooled recycle stream. Preferably, the amount of liquid in the cooled recycle stream is at least 15% and for example at most 35% by weight based on the total amount of liquid and gas in said cooled recycle stream.

High amounts of liquid in the cooled recycle stream enables feeding of one or more very high activity catalyst system.

The compressor (104) may be any device that is suitable for compressing the monomer feed and the recycle stream using the compressor (104) to form the compressed fluids. By compressing the monomer feed and the recycle stream, the pressure of the compressed fluids is increased compared to the monomer feed and the recycle stream before use of the compressor (104). Introduction of the cooled recycle stream under the distribution plate may be done using any suitable means for introducing fluids, for example using injection nozzles.

The person skilled in the art is aware of the type of inlets that may be suitable for allowing the recycle stream to enter into the reactor under the distribution plate.

In the process and system of the invention, the one or more α-olefin monomers and other fluids, such as hydrogen, an inert gas or liquid, for example a condensable inert component, may be added to the recycle stream to make up for reacted fluids before cooling the fluids to form the cooled recycle stream.

The first feed may comprises a chain transfer agent, for example hydrogen and may further comprise gaseous α-olefin monomers and insert gaseous components, for example nitrogen. A chain transfer agent, such as hydrogen, may for instance be used (as a chain transfer agent) to adjust the molecular weight of the polyolefin produced. A non-condensable comonomer may also be added in case of production of a copolymer. A non-condensable comonomer may also be added in case of production of a copolymer.

It is apparent to the skilled person that recycle streams may be present in the reaction system of the invention, for example there may be a recycle stream that is vented back from a polymer discharge system to the fluidized bed reactor aiming at an efficient discharge of the product while at the same time recycling a large portion of unreacted gasses back to the reactor.

Preferably, in the process of the invention, the circulating fluids are compressed using a compressor and subsequently cooled using a heat exchanger to form the cooled recycle stream.

TRRA

In the process of the invention, a thermal run away reducing agent (TRRA) is introduced into the reactor when needed, viz. when one or more of certain conditions are being met. This addition may be localized depending on the conditions. The TRRA is added into the reactor in one or more of multiple injection-points in a controlled, non-continuous way.

With thermal run away reducing agent (TRRA) is meant a chemical that is capable of slowing down or even killing the polymerization reaction by slowing down or even killing the catalyst. The TRRA may be selected from the group consisting of esters, amines, nitriles, amides and one or more combinations thereof.

Suitable esters for use as TRRA include but are not limited to carboxylic acid esters, for example aliphatic carboxylic acid esters, for example ethyl acrylate, methyl methacrylate, di-methyl carbonate, ethyl cyclohexanoatem propyl pivalate; and aromatic carboxylic acid esters, for example ethylbenzoate, methylbenzoate, p-methoxy ethylbenzoate, p-ethoxy ethylbenzoate, methylbenzoate, dimethyloxalate, p-chloro-ethylbenzoate, p-amino hexylbenzoate, isopropyl naphthanate, and n-amyl toluate.

Suitable amines for use as TRRA include but are not limited to aminobenzoate, aliphatic amines, for example N,N,N'N'-tetramethyl ethylene diamine; cycloaliphatic amines, for example 1,2,4-trimethyl piperazine, 2,3,4,5-tetraethyl piperidine and phthalates, for example dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, and di-2-ethyldecyl phthalate.

Suitable nitriles for use as TRRA include but are not limited to aromatic and aliphatic nitriles, for example alkane nitriles, for example trimethyl acetonitrile.

Suitable amides for use as TRRA include but are not limited to aromatic and aliphatic amides, for example n,n-dimethyl benzamide.

In an embodiment, the TRAA is selected from the group consisting of (aromatic) amides and aromatic carboxylic acid esters, more preferably the TRRA is selected from the group consisting of aromatic carboxylic acid esters. I a preferred embodiment, the TRRA is p-ethoxy ethyl benzoate (PEEB).

The optimal amount/concentration of TRRA may depend on the polymerization conditions and catalyst used and intended polymer. For example, the molar ratio of TRRA/Ti (in the catalyst) may be at least 0.5, for example at least 1, for example at least 1.5, for example at least 2, for example at least 2.5, for example at least 3, for example at least 3.5 and/or for example at most 10, for example at most 8, for example at most 7.

The TRRA is preferably added separately from any other component (recycle stream or catalyst or monomer or ED/SCA). The TRRA may be added into one of the inlet/feeds but it is preferably dosed separately in order to ensure effective working of the present invention. It may be added pure as a liquid or in solution. There are already several addition nozzles over the reactor wall in the zone of the fluidized bed that could be used for the addition of TRRA; no special equipment is required.

In an aspect the invention relates to a process for the continuous preparation of a polyolefin from one or more α-olefin monomers in a fluidized bed reactor, the process comprising the steps of feeding a polymerization catalyst and one or more monomers to the reactor, polymerizing the one or more monomers to produce a polyolefin in the reactor; withdrawing a polyolefin formed from the reactor, and circulating fluids withdrawn from the reactor via a heat exchanger to cool the fluids back into the reactor, wherein a thermal run away reducing agent (TRRA) is added to the reactor in a discontinuous way to prevent thermal runaway of the reactor. With "withdrawing a polyolefin is meant either actively withdrawing the polyolefin from the reactor or passively allow the polyolefin to exit the reactor.

In an aspect, the invention relates to a process for the continuous preparation of a polyolefin from one or more α-olefin monomers in a fluidized bed reactor, the process comprising the steps of feeding a polymerization catalyst and one or more monomers to the reactor, polymerizing the one or more monomers to produce a polyolefin in the reactor; withdrawing a polyolefin formed from the reactor, and circulating fluids withdrawn from the reactor via a heat exchanger to cool the fluids back into the reactor, wherein a thermal run away reducing agent (TRRA) is added to the reactor when one or more of the following conditions is met: A) the temperature of the reactor wall at one of the positions of a plurality of temperature sensing means is at least 2° C. above the average temperature of the plurality of temperature sensing means (hot spot); B) the (average) static voltage measured by one or more static voltage indicators is above 200 Volt; C) the polymerization temperature is at least 5° C. above a predetermined polymerization temperature; D) the polymer comprise more than 2 wt. % fines based on the weight of the polymer; E) the polymer comprises one or more agglomerates; F) the flow of the fluids via the heat exchanger decreases by 20 %.

Specific Embodiments

There are several different situations that might call for adding of TRRA, each of which are discussed in more detail below.

Increase in So-Called Skin Temperature

In a first embodiment, embodiment A, the present invention relates to a process for the continuous preparation of a polyolefin from one or more α-olefin monomers in a reactor system, the reactor system comprising: *a reactor comprising at least a lower part, a middle part and an upper part,—wherein a distribution plate and an inlet for a recycle stream below the distribution plate are located at the lower part of the reactor;—a fluidized bed, an inlet for a polymerization catalyst, an outlet for polyolefin, a plurality of temperature sensing means for measuring the temperature of an inner wall of the reactor, are located at the middle part of the reactor said middle of the reactor;—and an outlet for fluids is located at the upper part of the reactor, *a heat exchanger; *first connection means to connect the outlet for fluids to the heat exchanger; and *second connection means to connect the heat exchanger to the inlet for a recycle stream; the process comprising the continuous production of polyolefin by the steps of: +feeding a polymerization catalyst to the fluidized bed through the inlet for a polymerization catalyst; +feeding the one or more monomers to the reactor, +polymerizing the one or more monomers in the fluidized bed at a predetermined polymerization temperature to produce a polyolefin; +withdrawing polyolefin formed from the outlet for polyolefin, +withdrawing fluids from the outlet of fluids and circulating the fluids via the first connection means to the heat exchanger to cool the fluids to produce a cooled recycle stream which is introduced via the second connection means into the reactor via the inlet for the recycle stream; wherein a thermal run away reducing agent (TRRA) is added to the reactor when the following condition is met: the temperature of the reactor wall at one of the positions of the plurality of temperature sensing means is at least 2° C. above the average temperature of the plurality of temperature sensing means. This position where the reactor wall is at least 2° C. above the average temperature is called a hot spot.

In an embodiment there are three or preferably four or even five of more temperature sensing means near the wall per level; wherein it can be stated that the reactor may be divided into several levels along its length, for example in three levels, four levels, five levels or even six levels. In an embodiment, there are four thermocouples per level and there are between 4 and 6 levels, such as five levels in the reactor. With the average temperature is meant a mathematical average over all the temperature sensing means that are present near the wall measuring the—including the one that might measure a hot spot; said average may constantly change as the temperature changes, hence a mathematical moving average. It should be noted that additional temperature sensing means may be present in the bed that are not near the wall of the reactor. With "near the wall of the reactor" is meant in this description within a distance of 60 cm from the reactor wall, for example within a distance of 50 or 40 or even 30 cm from the reactor wall.

The temperature of the inner wall of the reactor is also called the skin temperature. When spikes (local increases) in the skin temperature occur, so-called hot spots are formed. These are localized areas in the reactor that are hotter than the remaining part of the reactor. These hot spots might lead to thermal run away or to increase heterogeneity of the polyolefin form, which are both undesirable. In order to be able to closely control the polymerization reaction there are—in this embodiment—a plurality of temperature sensing means, such as sensors or thermocouples or other temperature sensors, which sense/measure the temperature at different spots/locations on the inner wall of the reactor, preferably at different vertical positions in view of the distribution plate. When one of these sensing means shows a temperature that it higher than the rest of the sensing means, such as a value of at least 2° C. above the average of the all the sensing means this is a so-called "pre-alarm". This is a sign that there might become an issue of thermal runaway at that specific location/vertical position in the reactor. According to an embodiment of the present invention a TRRA may be added at this moment so that this possible issue is reduced/eliminated. In order to have full effectiveness of the TRRA added and to not reduce the productivity in any other part for the reactor, the TRRA is preferably added at a location that is vertically somewhat below the hot spot; due to the rising nature of the fluidizing gas, the TRRA will be distributed to the location that is in possible risk and the risk is averted. This is hence location and time dependent dosing of TRRA allowing for the use of only a very limited amount of TRRA which does not lead to a large decrease of productivity, something that is frequently observed with continuously TRRA addition combined with the addition of SCA/ED.

Increase in Static Voltage

In a second embodiment, embodiment B, the present invention relates to a process for the continuous preparation of a polyolefin from one or more α-olefin monomers in a reactor system, the reactor system comprising: *a reactor comprising at least a lower part, a middle part and an upper part, —wherein a distribution plate and an inlet for a recycle stream below the distribution plate are located at the lower part of the reactor; —a fluidized bed, an inlet for a polymerization catalyst, an outlet for polyolefin, one or more static voltage indicators for measuring the static voltage are located at the middle part of the reactor said middle of the reactor; and—an outlet for fluids is located at the upper part of the reactor, *a heat exchanger; *first connection means to connect the outlet for fluids to the heat exchanger; and *second connection means to connect the heat exchanger to the inlet for a recycle stream; the process comprising the continuous production of polyolefin by the steps of: +feeding a polymerization catalyst to the fluidized bed through the inlet for a polymerization catalyst; +feeding the one or more monomers to the reactor, +polymerizing the one or more monomers in the fluidized bed at a predetermined polymerization temperature to produce a polyolefin; +withdrawing polyolefin formed from the outlet for polyolefin, +withdrawing fluids from the outlet of fluids and circulating the fluids via the first connection means to the heat exchanger to cool the fluids to produce a cooled recycle stream which is introduced via the second connection means into the reactor via the inlet for the recycle stream; wherein a thermal run away reducing agent (TRRA) is added to the reactor when the following condition is met: the (average) static voltage measured by the one or more static voltage indicators is above 200 Volt. The electrostatic charges are measured using a volt meter. Preferably values are within the range of −200 to 200 Volts; when the static voltage goes out of this range there is an indication of instability in the reactor.

Static voltage in the reactor can be monitored e.g. near the reactor wall by one or more static voltage indicators that may be inserted into the reactor bed. They may be present at a level of 3 to 8 feet above the distributor plate in the range of −3,000 to +3,000 volts. Where there is too much static build up, this might lead to formation of agglomerates and ultimately to disruption of the process. Agglomerates are resin particles that stick together and can have a size of up to one inch in diameter. They are observed visually, by the eye. The presence of agglomerates indicates the presence of hot-spots which may result in larger sized sheets/chunks and impact the reactor continuity if not addressed adequately. In order to prevent this from happening TRRA is added/dosed according to the invention. In a specific embodiment the TRRA is dosed at the inlet of the recycle gas, e.g. below the distribution plate and is hence distributed over the fluidized bed by the fluidizing gas. The advantage of this point of addition in this specific case is that allows uniform distribution of TRRA through the bed and presents fouling of the distributer plate if the first injection is below it since if the reactor is instable and for example has a too large amount of fines, fines could be carried out and start to depose on the distributer plate which could lead to clogging of the holes in said distributer plate leading to decrease in fluidization which would provide even more instability in the reactor.

Increase in Polymerization Temperature

In a third embodiment, embodiment C, the present invention relates to a process for the continuous preparation of a polyolefin from one or more α-olefin monomers in a reactor system, the reactor system comprising: *a reactor comprising at least a lower part, a middle part and an upper part,—wherein a distribution plate and an inlet for a recycle stream below the distribution plate are located at the lower part of the reactor;—a fluidized bed, an inlet for a polymerization catalyst, an outlet for polyolefin, are located at the middle part of the reactor said middle of the reactor; and—an outlet for fluids is located at the upper part of the reactor, *a heat exchanger; *first connection means to connect the outlet for fluids to the heat exchanger; and *second connection means to connect the heat exchanger to the inlet for a recycle stream; the process comprising the continuous production of polyolefin by the steps of: +feeding a polymerization catalyst to the fluidized bed through the inlet for a polymerization catalyst; +feeding the one or more monomers to the reactor, +polymerizing the one or more monomers in the fluidized bed at a predetermined polymerization temperature to produce a polyolefin; +withdrawing polyolefin formed from the outlet for polyolefin, +withdrawing fluids from the outlet of fluids and circulating the fluids via the first connection means to the heat exchanger to cool the fluids to produce a cooled recycle stream which is introduced via the second connection means into the reactor via the inlet for the recycle stream; wherein a thermal run away reducing agent (TRRA) is added to the reactor when the following condition is met: the polymerization temperature is at least 5° C. above the predetermined polymerization temperature.

The temperature of polymerization is measured using several temperature sensing means, e.g. thermocouples that are measuring the temperature near the reactor wall (meaning with a distance of maximally 60 cm from the reactor wall). Hence the temperatures that are measured are also called skin temperatures. These skin temperatures are indicative of reactor runaway and are not controlled as such, what is controlled during the reaction is the temperature of the fluidized bed. The bed temperature is preferably controlled by a loop linked to the cycle gas cooler that adjust the cooling water outlet flow rate based on the set temperature of the bed. The boundaries of the temperature of the reactor bed depend on the type and recipe of the polymer to be produced and the specifications of the reactor.

When the temperature of polymerization tends to increase to a too high lever, there is a significant risk of reactor runaway leading to all sorts of problems. In order to prevent this from happening TRRA is added/dosed according to the invention. In a specific embodiment the TRRA is dosed at the inlet of the recycle gas, e.g. below the distribution plate and is hence distributed over the fluidized bed by the fluidizing gas. The advantage of this point of addition in this specific case is that the TRRA will be distributed over the full fluidized bed and is able to react to its full extend to lower the polymerization temperature.

When the polymerization temperature is sufficiently reduced, the addition may be halted and the reaction can proceed without any disruption.

Increase in Fines

In a fourth embodiment, embodiment D, the present invention relates to a process for the continuous preparation of a polyolefin from one or more α-olefin monomers in a reactor system, the reactor system comprising: *a reactor comprising at least a lower part, a middle part and an upper part,—wherein a distribution plate and an inlet for a recycle stream below the distribution plate are located at the lower part of the reactor;—a fluidized bed, an inlet for a polymerization catalyst, an outlet for polyolefin, are located at the middle part of the reactor said middle of the reactor; and—an outlet for fluids is located at the upper part of the reactor, *a heat exchanger; *first connection means to connect the outlet for fluids to the heat exchanger; and *second connection means to connect the heat exchanger to the inlet for a recycle stream; the process comprising the continuous production of polyolefin by the steps of: +feeding a polymerization catalyst to the fluidized bed through the inlet for a polymerization catalyst; +feeding the one or more monomers to the reactor, polymerizing the one or more monomers in the fluidized bed at a predetermined polymerization temperature to produce a polyolefin; +withdrawing polyolefin formed from the outlet for polyolefin, and determine the percentages of fines in the polyolefin; +withdrawing fluids from the outlet of fluids and circulating the fluids via the first connection means to the heat exchanger to cool the fluids to produce a cooled recycle stream which is introduced via the second connection means into the reactor via the inlet for the recycle stream; wherein a thermal run away reducing agent (TRRA) is added to the reactor when the following condition is met: the polymer comprise more than 2 wt. % fines based on the weight of the polymer.

When the percentages of fines in the polyolefin tends to increase this is disadvantageous. Fines easily adhere to the reactor walls due to electrostatic-forces and increases the probability of sheeting at the walls. High fines also increases the chances of carry-over and fouling of the cycle gas loop, including compressor, cooler and the distributor plate. There is thus also a significant risk of reactor runaway leading to all sorts of problems. In order to prevent this from happening TRRA is added/dosed according to the invention. In a specific embodiment the TRRA is dosed at the inlet of the recycle gas, e.g. below the distribution plate and is hence distributed over the fluidized bed by the fluidizing gas. The advantage of this point of addition in this specific case is that the TRRA will be distributed over the full fluidized bed and is able to react to its full extend to lower the percentage of fines.

Increase in Agglomerates

In a fifth embodiment, embodiment E, the present invention relates to a process for the continuous preparation of a polyolefin from one or more α-olefin monomers in a reactor system, the reactor system comprising: *a reactor comprising at least a lower part, a middle part and an upper part,—wherein a distribution plate and an inlet for a recycle stream below the distribution plate are located at the lower part of the reactor;—a fluidized bed, an inlet for a polymerization catalyst, an outlet for polyolefin, are located at the middle part of the reactor said middle of the reactor; and—an outlet for fluids is located at the upper part of the reactor, *a heat exchanger; *first connection means to connect the outlet for fluids to the heat exchanger; and *second connection means to connect the heat exchanger to the inlet for a recycle stream; the process comprising the continuous production of polyolefin by the steps of: +feeding a polymerization catalyst to the fluidized bed through the inlet for a polymerization catalyst; +feeding the one or more monomers to the reactor, +polymerizing the one or more monomers in the fluidized bed at a predetermined polymerization temperature to produce a polyolefin; +withdrawing polyolefin formed from the outlet for polyolefin, and determine the presence of agglomerates in the polyolefin; +withdrawing fluids from the outlet of fluids and circulating the fluids via the first connection means to the heat exchanger to cool the fluids to produce a cooled recycle stream which is introduced via the second connection means into the reactor via the inlet for the recycle stream; wherein a thermal run away reducing agent (TRRA) is added to the reactor when the following condition is met: the polymer comprises one or more agglomerates.

When agglomerates tend to appear in the polyolefin, there is a significant risk of reactor runaway leading to reactor continuity issues. In order to prevent this from happening TRRA is added/dosed according to the invention. In a specific embodiment the TRRA is dosed at the inlet of the recycle gas, e.g. below the distribution plate and is hence distributed over the fluidized bed by the fluidizing gas. The advantage of this point of addition in this specific case is that the TRRA will be distributed over the full fluidized bed and is able to react to its full extend to reduce or eliminate the occurrence of agglomerates.

Decrease in Fluids Flow

In a sixth embodiment, embodiment F, the present invention relates to a process for the continuous preparation of a polyolefin from one or more α-olefin monomers in a reactor system, the reactor system comprising: *a reactor comprising at least a lower part, a middle part and an upper part,—wherein a distribution plate and an inlet for a recycle stream below the distribution plate are located at the lower part of the reactor;—a fluidized bed, an inlet for a polymerization catalyst, an outlet for polyolefin, are located at the middle part of the reactor said middle of the reactor; and—an outlet for fluids is located at the upper part of the reactor, *a heat exchanger; *first connection means to connect the outlet for fluids to the heat exchanger; and *second connection means to connect the heat exchanger to the inlet for a recycle stream; wherein the heat exchanger, first connection means and/or second connection means comprise means for measuring the flow of fluid; the process comprising the continuous production of polyolefin by the steps of: +feeding a polymerization catalyst to the fluidized bed through the inlet for a polymerization catalyst; +feeding the one or more monomers to the reactor, +polymerizing the one or more monomers in the fluidized bed at a predetermined polymerization temperature to produce a polyolefin; +withdrawing polyolefin formed from the outlet for polyolefin; +withdrawing fluids from the outlet of fluids and circulating the fluids via the first connection means to the heat exchanger to cool the fluids to produce a cooled recycle stream which is introduced via the second connection means into the reactor via the inlet for the recycle stream; wherein a thermal run away reducing agent (TRRA) is added to the reactor when the following condition is met: the flow of the fluids in the first connection means, heat exchanger and/or second connection means decreases by 20% or the cycle gas compressor comes to a stop.

When there is a reduction of the flow of the cycle gas or a complete stop in the flow this will lead to the settling of the fluidized bed which in turn might lead to reactor problems, such as runaway. In order to determine a decrease the flow is measured either continuously or intermittently with means known to a person skilled in the art. When a decrease of at least 20% is observed in the flow, wherein the flow at the start is taken as 100% (in other words, when the flow drops from 100% to 80% or less) TRRA is added in this embodiment. As soon as there is a reduction, according to the method of the present invention TRRA may be added to slow down or even stop the polymerization reaction, this will prevent runaway or clogging of the reactor. Even though the act of adding the TRRA in itself will not solve the problem and will not reinstate the cycle gas flow, it will significantly reduce any associated problems and decreases the time it will require to start up the reactor again. Decrease in the flow may be caused by several issues, such as problems with the distributor plate, clogging of a line or condenser issues.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The invention will now be elucidated by way of the following examples, without being limited thereto.

EXAMPLES

The effect of the discontinuous addition of TRRA is demonstrated by the following non-limiting example. A titanium containing Ziegler-Natta catalyst composition, including diisobutylphthalate as internal donor and Methyl cyclohexyl dimethoxysilane (C-donor) as external electron donor, is used to produce polypropylene homopolymers. A fluidized gas-phase reactor was being operated to produce polypropylene homopolymer, having high static and skin activity. The polymerization rates were reduced to less than half, at 22 TPH (tons per hour), of the normal production rates to control the skin activities and improve the reactor stability. p-Ethoxy ethyl benzoate (PEEB) was then dosed into the reactor bed, at certain ratios to the catalyst feed-rate and controlled further by monitoring the catalyst activity and the skin activity.

It was seen that with the gradual addition of PEEB, the catalyst activity reduced proportionally and also the skin-activity indicated by hot-spots started cooling off. As reactor stability improved in terms of skin activity, the polymerization rates were slowly increased and were brought back to normal rates of 46 TPH. At this point, the reduction in catalyst activity was seen to be around 15% due to addition of PEEB. It was noted that hydrogen response of the catalyst remained the same even after the addition of PEEB. It was further observed that the catalyst selectivity improved with the PEEB addition and that the requirement of normal external donor (C-donor) reduced by almost 40% during the trial period.

The trial was continued for a period of 30 days to demonstrate the reactor stability regained, with the use of PEEB, even in a reactor which was highly unstable faced with hot spots and skin activities. The TRRA may be advantageously introduced at multiple points, more particularly in the recycling line of the gaseous reaction mixture—below the distributor plate, in the reactor bed and in the upper part of the reactor. Based on the signs of process instability, one or more or all the injection points may be used for the intermittent dosing of the TRRA. The data for the trials are summarized below:

TABLE 1

| TRRA/Ti molar ratio | Productivity for a polymer having a MFR of 3 grams/10 min and an XS value of 3% (in MT/kg -solid) |
| --- | --- |
| 0 | 22.0 |
| 4 | 21.3 |
| 5 | 20.0 |
| 6 | 20.2 |
| 7 | 19.3 |

This table clearly shows that the lower the ratio the higher the productivity.

It was observed that the skin activity decreased from between 5-10° C. prior to TRAA addition to between 0-2° C. after TRRA addition.

The invention claimed is:

1. A process for the continuous preparation of a polyolefin from one or more α-olefin monomers in a reactor system, the reactor system comprising:
   a reactor having a wall comprising:
      a lower part, comprising a distribution plate and an inlet for a recycle stream below the distribution plate;
      a middle part above said lower part, said middle part comprising a fluidized bed, an inlet for a polymerization catalyst, an outlet for polyolefin; and
      an upper part above said middle part, said upper part comprising an outlet for fluids;
   a heat exchanger;
   first connection means for fluids connecting the outlet for fluids to the heat exchanger; and
   second connection means for fluids connecting the heat exchanger to the inlet for a recycle stream;
   the process for the continuous preparation of the polyolefin comprising the steps of:
      feeding a polymerization catalyst to the fluidized bed through the inlet for a polymerization catalyst;
      feeding the one or more monomers to the reactor,
      polymerizing the one or more monomers in the fluidized bed at a polymerization temperature to prepare the polyolefin;
      withdrawing the polyolefin that is formed from the reactor through the outlet for polyolefin;
      withdrawing fluids from the reactor through the outlet for fluids and transporting the fluids through the first connection means and the heat exchanger to cool the fluids, to produce a cooled recycle stream, and through the second connection means and through the inlet for the recycle stream back into the reactor;
   wherein the temperature of the reactor wall is measured at a plurality of positions by a plurality of temperature sensing means and wherein a thermal run away reducing agent (TRRA) is added to the reactor when at least one of a plurality of the temperature sensing means measures a temperature that is at least 2° C. above the average temperature of the plurality of temperature sensing means; and/or
   wherein the static voltage is measured by one or more static voltage indicators and wherein a thermal run away reducing agent (TRRA) is added to the reactor when the static voltage is above 200 Volt; and/or
   wherein the polymerization temperature is measured and wherein a thermal run away reducing agent (TRRA) is added to the reactor when the polymerization temperature is at least 5° C. above a predetermined value for the polymerization temperature, wherein a titanium-comprising polymerization catalyst is used and wherein the molar ratio of the TRRA to titanium in the polymerization catalyst (TRRA/Ti) is at least 1.0; and/or wherein the polyolefin withdrawn from the reactor is analyzed to determine the percentage of fines and wherein a thermal run away reducing agent (TRRA) is added to the reactor when the polyolefin comprises more than 2 wt. % fines based on the weight of the polyolefin; and/or wherein the polyolefin withdrawn from the reactor is analyzed to determine the presence of one or more agglomerates and wherein a thermal run away reducing agent (TRRA) is added to the reactor when one or more agglomerates are observed; and/or wherein the flow of fluids through the heat exchanger, first connection means and/or second connection means is measured using fluid flow measuring means and wherein a thermal run away reducing agent (TRRA) is added to the reactor when the flow decreases by at least 20% per unit of time; and further wherein
the addition of TRRA is performed for a period of at most 20 minutes; and/or
the TRRA is selected from the group consisting of ethyl acrylate, methyl methacrylate, di-methyl carbonate, ethyl cyclohexanoate, propyl pivalate, ethylbenzoate, methylbenzoate, p-methoxy ethylbenzoate, p-ethoxy ethylbenzoate, methylbenzoate, dimethyloxalate, p-chloroethylbenzoate, p-amino hexylbenzoate, isopropyl naphthanate, n-amyl toluate, 1,2,4-trimethyl piperazine, 2,3,4,5-tetraethyl piperidine, dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, and di-2-ethyldecyl phthalate, trimethyl acetonitrile, and N,N-dimethyl benzamide.

2. The process according to claim 1, where the one or more monomers at least include ethylene or propylene.

3. The process according to claim 1, wherein the polymerization temperature is measured and wherein a thermal run away reducing agent (TRRA) is added to the reactor when the polymerization temperature is at least 5° C. above the predetermined value of the polymerization temperature, wherein said TRRA is added through an inlet for TRRA at the inlet for recycle gas.

4. The process according to claim 1, wherein the polyolefin withdrawn from the reactor is analyzed to determine the percentage of fines and wherein a thermal run away reducing agent (TRRA) is added to the reactor when the polyolefin comprise more than 2 wt. % fines based on the weight of the polyolefin, wherein said TRRA is added through an inlet for TRRA at the inlet for recycle gas.

5. The process according to claim 1, wherein the addition of TRRA is performed for a period of at most 20 minutes.

6. The process according to claim 1, wherein a titanium-comprising polymerization catalyst is used and the thermal runaway reducing agent is added to the reactor with a TRRA/Ti molar ratio of between 10 and 20.

7. The process according to claim 1, wherein the temperature of the reactor wall is measured at a plurality of positions by a plurality of temperature sensing means and wherein a thermal run away reducing agent (TRRA) is added to the reactor when at least one of a plurality of the temperature sensing means measures a temperature that is at least 2° C. above the average temperature of the plurality of temperature sensing means, wherein the titanium-comprising polymerization catalyst is used and wherein the molar ratio of the TRRA to titanium in the polymerization catalyst (TRRA/Ti) is at least 1.0.

8. The process according to claim 1, wherein the static voltage is measured by one or more static voltage indicators and wherein the thermal run away reducing agent (TRRA) is added to the reactor when the static voltage is above 200 Volt, wherein the titanium-comprising polymerization catalyst is used and wherein the molar ratio of the TRRA to titanium in the polymerization catalyst (TRRA/Ti) is at least 1.0.

9. The process according to claim 1, wherein the TRRA is selected from the group consisting of ethyl acrylate, methyl methacrylate, di-methyl carbonate, ethyl cyclohexanoate, propyl pivalate, ethylbenzoate, methylbenzoate, p-methoxy ethylbenzoate, p-ethoxy ethylbenzoate, methylbenzoate, dimethyloxalate, p-chloroethylbenzoate, p-amino hexylbenzoate, isopropyl naphthanate, n-amyl toluate, 1,2,4-trimethyl piperazine, 2,3,4,5-tetraethyl piperidine, dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, and di-2-ethyldecyl phthalate, trimethyl acetonitrile, and N,N-dimethyl benzamide.

10. The process according to claim 9, where the one or more monomers at least include ethylene or propylene.

11. A process for the continuous preparation of a polyolefin from one or more α-olefin monomers in a reactor system, the reactor system comprising:
a reactor having a wall comprising:
a lower part, comprising a distribution plate and an inlet for a recycle stream below the distribution plate;
a middle part above said lower part, said middle part comprising a fluidized bed, an inlet for a polymerization catalyst, an outlet for polyolefin; and
an upper part above said middle part, said upper part comprising an outlet for fluids;
a heat exchanger;
first connection means for fluids connecting the outlet for fluids to the heat exchanger; and
second connection means for fluids connecting the heat exchanger to the inlet for a recycle stream;
the process for the continuous preparation of the polyolefin comprising the steps of:
feeding a polymerization catalyst to the fluidized bed through the inlet for a polymerization catalyst;
feeding the one or more monomers to the reactor,
polymerizing the one or more monomers in the fluidized bed at a polymerization temperature to prepare the polyolefin;
withdrawing the polyolefin that is formed from the reactor through the outlet for polyolefin;
withdrawing fluids from the reactor through the outlet for fluids and transporting the fluids through the first connection means and the heat exchanger to cool the fluids, to produce a cooled recycle stream, and through the second connection means and through the inlet for the recycle stream back into the reactor;
wherein a titanium-comprising polymerization catalyst is used and wherein a molar ratio of a thermal run away reducing agent (TRRA) added to the reactor to titanium in the polymerization catalyst (TRRA/Ti) is at least 1.0.

12. The process according to claim 11, wherein the thermal runaway reducing agent is added to the reactor with a TRRA/Ti ratio of between 1.0 and 10.0.

13. The process according to claim 11, wherein the thermal runaway reducing agent is added to the reactor with a TRRA/Ti molar ratio of between 10 and 20.

14. The process according to claim 11, wherein the TRRA/Ti ratio is between 1.0 and 4.0.

15. The process according to claim 11, wherein the thermal runaway reducing agent is added to the reactor in more than one step, with an increase in the TRRA/Ti ratio for each subsequent step.

16. The process according to claim 15, wherein the increase in the TRRA/Ti ratio is with increasing steps of at least 0.2 molar ratios.

17. A process for the continuous preparation of a polyolefin from one or more α-olefin monomers in a reactor system, the reactor system comprising:
- a reactor having a wall comprising:
  - a lower part, comprising a distribution plate and an inlet for a recycle stream below the distribution plate;
  - a middle part above said lower part, said middle part comprising a fluidized bed, an inlet for a polymerization catalyst, an outlet for polyolefin; and
  - an upper part above said middle part, said upper part comprising an outlet for fluids;
- a heat exchanger;
- first connection means for fluids connecting the outlet for fluids to the heat exchanger; and
- second connection means for fluids connecting the heat exchanger to the inlet for a recycle stream;

the process for the continuous preparation of the polyolefin comprising the steps of:
- feeding a polymerization catalyst to the fluidized bed through the inlet for a polymerization catalyst;
- feeding the one or more monomers to the reactor;
- polymerizing the one or more monomers in the fluidized bed at a polymerization temperature to prepare the polyolefin;
- withdrawing the polyolefin that is formed from the reactor through the outlet for polyolefin;
- withdrawing fluids from the reactor through the outlet for fluids and transporting the fluids through the first connection means and the heat exchanger to cool the fluids, to produce a cooled recycle stream, and through the second connection means and through the inlet for the recycle stream back into the reactor;

wherein the temperature of the reactor wall is measured at a plurality of positions by a plurality of temperature sensing means and wherein a thermal run away reducing agent (TRRA) is added to the reactor when at least one of a plurality of the temperature sensing means measures a temperature that is at least 2° C. above the average temperature of the plurality of temperature sensing means, the position of said at least one of a plurality of the temperature sensing means being defined as a hot spot; wherein TRRA is added through an inlet for TRRA, which is below the vertical position of the hot spot.

* * * * *